United States Patent [19]
Sartore

[11] Patent Number: 5,931,334
[45] Date of Patent: Aug. 3, 1999

[54] THERMAL CONTAINER WITH DOUBLE METAL WALL AND METHOD FOR MANUFACTURING IT

[75] Inventor: Almerigo Sartore, Fontaniva, Italy

[73] Assignee: Elite Srl, Italy

[21] Appl. No.: 09/117,745

[22] PCT Filed: Nov. 7, 1996

[86] PCT No.: PCT/EP96/04862

§ 371 Date: Aug. 3, 1998

§ 102(e) Date: Aug. 3, 1998

[87] PCT Pub. No.: WO97/31562

PCT Pub. Date: Sep. 4, 1997

[30] Foreign Application Priority Data

Feb. 29, 1996 [IT] Italy ................................. VI96A0026

[51] Int. Cl.⁶ .................................................. B65D 25/18
[52] U.S. Cl. ............................... 220/592.16; 220/592.27; 220/918; 220/560.1
[58] Field of Search .................... 220/592.16, 592.17, 220/592.2, 592.27, 23.83, 23.86, 23.87, 506, 601, 640, 918, 560.12, 560.1, 560.15

[56] References Cited

U.S. PATENT DOCUMENTS

| 2,828,043 | 3/1958 | Hosford . | |
|---|---|---|---|
| 2,834,503 | 5/1958 | Knapp . | |
| 2,874,865 | 2/1959 | Canty et al. | 220/592.27 |
| 3,069,045 | 12/1962 | Haumann et al. | 220/592.27 |
| 3,207,354 | 9/1965 | Skinner et al. | 220/560.1 |
| 3,705,498 | 12/1972 | De Haan | 220/592.27 |
| 4,351,451 | 9/1982 | Chung . | |
| 4,394,929 | 7/1983 | Patel et al. | 220/560.12 |
| 4,481,779 | 11/1984 | Barthel | 220/592.27 |
| 4,572,402 | 2/1986 | Gervais et al. . | |
| 5,634,256 | 6/1997 | Fritschi | 220/592.27 |

FOREIGN PATENT DOCUMENTS

| 95810315 | 6/1995 | European Pat. Off. . |
|---|---|---|
| 590 235 | 10/1968 | France . |
| 192 013 | 11/1907 | Germany . |
| 537 438 | 11/1931 | Germany . |
| 805 530 | 5/1951 | Germany . |

*Primary Examiner*—Stephen Castellano
*Attorney, Agent, or Firm*—R. Neil Sudol; Henry D. Coleman

[57] ABSTRACT

Double-walled thermal container, comprising a first inner vessel inserted in a second outer vessel. The two vessels are connected by a connecting element so as to form a vacuum interspace between the inner and outer vessels.

11 Claims, 3 Drawing Sheets

THERMAL CONTAINER WITH DOUBLE METAL WALL AND METHOD FOR MANUFACTURING IT

The present invention relates to a thermal container with double wall made of metallic material, particularly but not exclusively for beverages and food liquids, such as bottles, kettles, thermal vessels, canteens, hot beverage vending machines, and the like. The invention furthermore relates to a method for manufacturing thermal containers of the above type.

It is known that double-walled thermal containers that have an inner mirror-finished surface, are known in physics as "Dewar flasks", and are commonly known as "thermos bottles", are used to keep beverages and food liquids in general at a temperature other than the ambient one.

More specifically, conventional commercial thermos bottles are constituted by an inner vessel made of glass and by an outer vessel made of metal or plastic, which are separated by an interspace that is empty or filled with an insulating material and sealed hermetically.

Although these conventional containers are characterized by good efficiency and thermal stability, they are intrinsically rather fragile and therefore unsuitable for heavy-duty uses, such as for example in a sports context and for outdoors use.

Therefore, when greater resistance to stresses and vibrations is required, thermal containers with a double metallic wall, made for -example of aluminum and/or stainless steel, are used.

A conventional type of thermal container with a double metallic wall, described in European Patent application No. 95810315.2 and shown schematically in FIG. 1, essentially includes a first inner vessel made of stainless steel or aluminum that is enclosed in a second outer vessel made of aluminum.

The two vessels are rigidly and hermetically connected, proximate to their respective necks, by a connecting part that is also metallic, so as to form a sealed interspace between them, in which a vacuum is produced.

A drawback of this conventional container is that the metallic connecting part acts as a thermal bridge between the two containers, allowing a certain exchange of heat that considerably reduces the efficiency of the bottle.

Another drawback of conventional thermal containers is the constructive and assembly complexity which can require the mutual welding of different metals, which is notoriously difficult.

Another drawback of conventional thermal containers with double metal walls is their complicated manufacturing method.

The aim of the present invention is to provide a thermal container with double metal wall that maintains the utilization temperature of the contained substances for a longer time than conventional similar bottles.

Another object of the invention is to provide a thermal container that is strong but also light and is also universal, that is to say, can be coupled to any support for sports and/or amateur use.

Another object of the invention is to provide a simple and relatively cheap method for producing thermal containers having the properties outlined in the above aim and object.

This aim and these objects are achieved by a container and by a method for manufacturing said container, as claimed in the appended claims.

The absence of thermal bridges between the two metallic vessels ensures that the utilization temperature of the content of the container is maintained for a longer time than in similar conventional thermal bottles.

Another aspect of the invention relates to a method for producing a thermal container of the above described type, characterized in that it includes the following steps:

a) preparation of a first inner metal vessel which has a first upper opening that can be closed by a detachable closure means;

b) preparation of a second outer metal vessel that is larger than the first one and also has a second upper opening;

c) insertion, in the outer vessel, of a chemical means that absorbs gas and $H_2O$ and is stably anchored to the base;

d) insertion of the inner vessel in the outer vessel and mutual locking thereof, proximate to the respective openings, by virtue of a rigid and hermetic connecting assembly that is formed entirely of nonmetallic and non-heat-conducting material;

e) removal of the air contained in the interspace by virtue of a vacuum means.

By virtue of this relatively simple and quick production method, the production costs of the bottle are reduced considerably.

Further characteristics and advantages of the bottle according to the invention and of the corresponding manufacturing method will become apparent from the following description, which is given by way of non-limitative example with the aid of the accompanying drawings, wherein.

Figure 1:
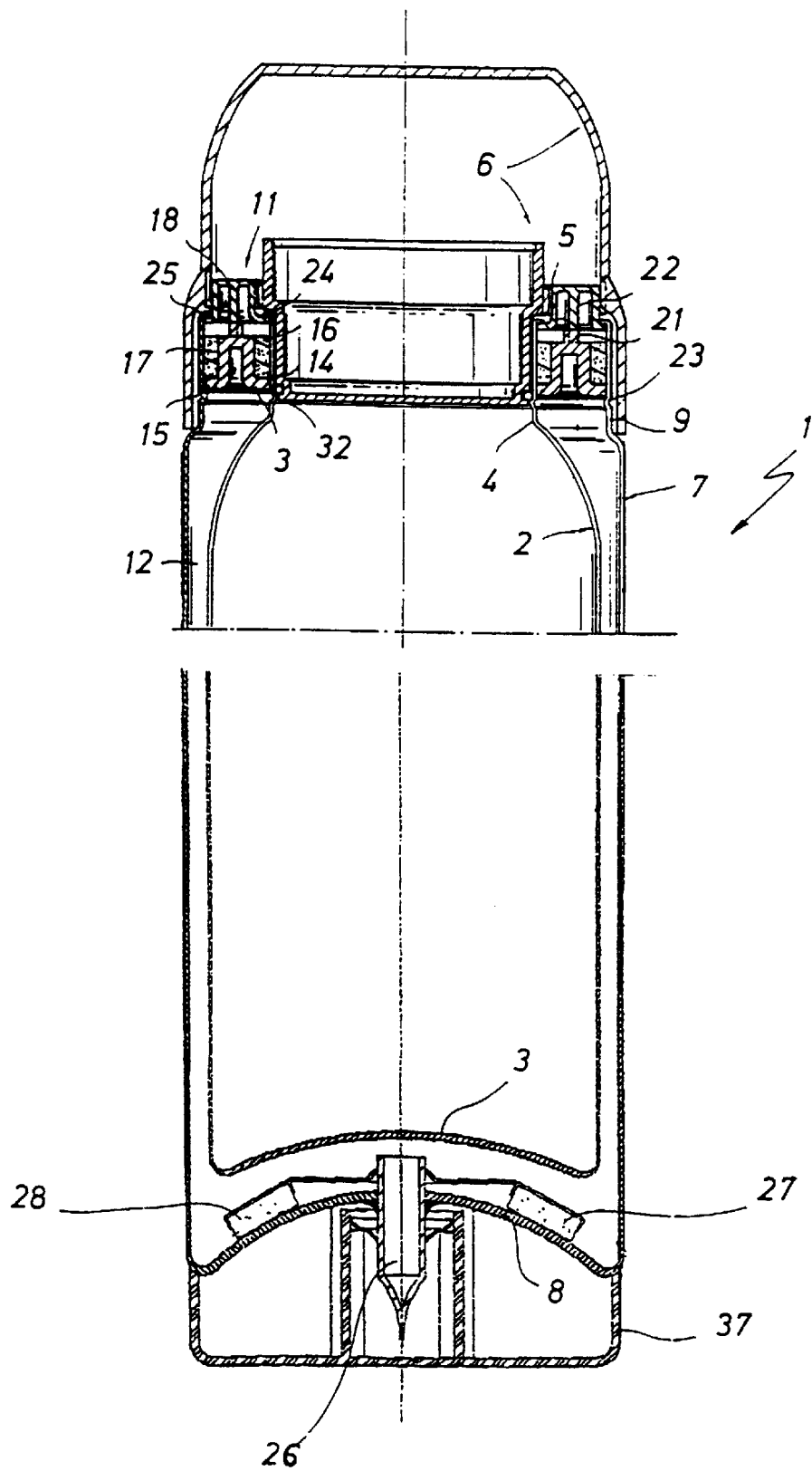
FIG. 1 is a schematic longitudinal sectional view of the thermal bottle according to the invention.
Figure 2:
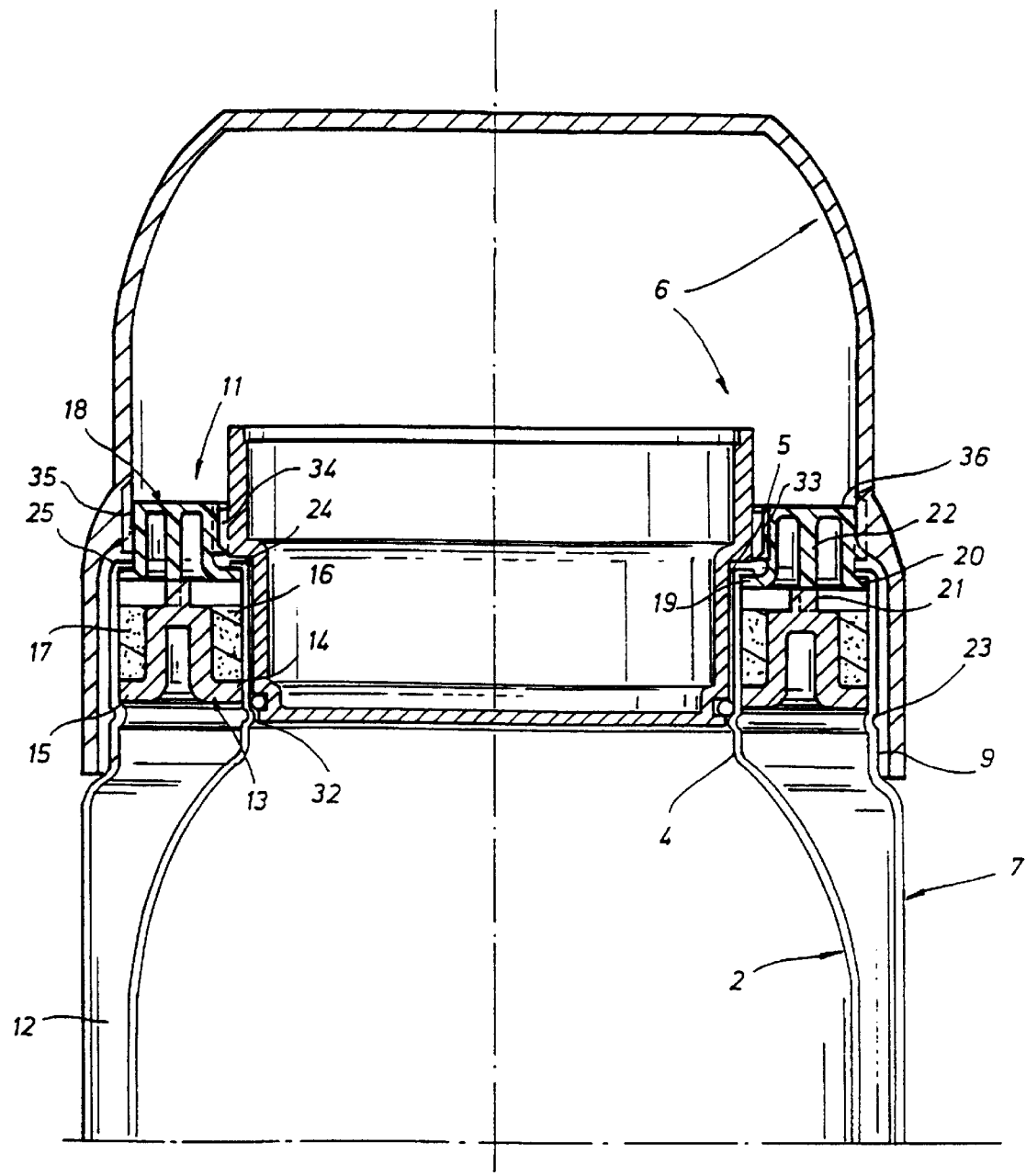
FIG. 2 is an enlarged-scale view of a detail of the bottle of FIG. 1.
Figure 3:
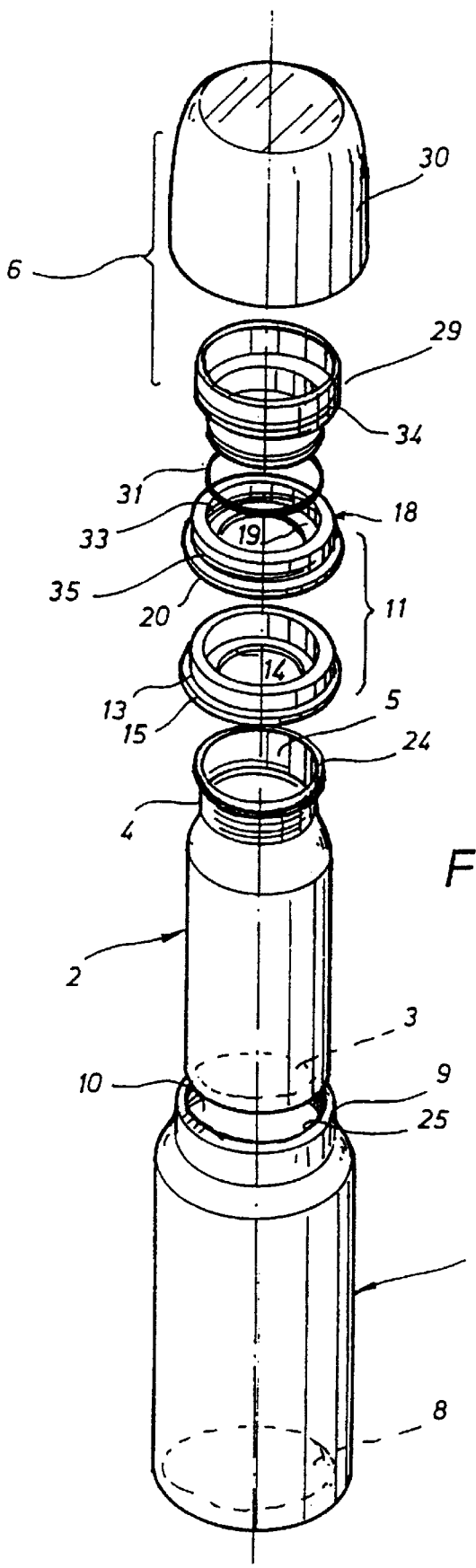
FIG. 3 is an exploded perspective view of the bottle of FIG. 1.

With reference to the above figures, the container according to the invention, generally designated by the reference numeral 1, for example of the thermal canteen type for sports use, includes an inner vessel 2 made of metallic material, for example aluminum alloy, which has a substantially cylindrical shape, with a bottom 3 that is curved slightly inward and with an upper tapering region 4, which forms a first opening 5 which can be closed by a detachable cup-shaped plug 6. The cross-sectional shape of the container may be circular, but it may also be polygonal without abandoning the scope of the invention.

The inner vessel 2 is arranged inside an outer vessel 7 that is also made of a metallic material, such as aluminum alloy, that is similar in shape to the first vessel but larger, with a bottom 8 that is curved inward and with an upper tapering portion 9 which forms a second opening 10.

The inner vessel 2 and the outer vessel 7 are mutually rigidly and hermetically coupled by virtue of a connecting assembly 11 arranged proximate to the respective openings 5 and 10, so as to form, between the two vessels, an interspace 12 in which vacuum is formed by a suction means, which will be described hereinafter.

According to the invention, the connecting assembly 11 is constituted exclusively of parts made of nonmetallic material with low thermal conductivity, so as to form an effective heat barrier, preventing direct contact between the two vessels 2 and 7.

In particular, the connecting assembly 11 is constituted by a first annular plastic part 13 whose radial edges, respectively the inner one 14 and the outer one 15, are in contact with the outer wall of the tapering portion 4 and with the inner wall of the tapering portion 9 respectively.

Thus, the annular part 13 forms, together with the walls 4, one or two annular pockets 16 and 17, more specifically an innermost pocket 16 and an outermost pocket 17, in which a sealing plastic resin, for example polyurethane resin, is injected.

The assembly 11 includes a second annular part 18, which is also made of plastic, has a substantially omega-like cross-section, is superimposed on the first part 13, and has annular edges, respectively an inner edge 19 and an outer edge 20, that are in contact with the facing surfaces of the tapering portions 4 and 9 of the vessels.

In order to increase the rigidity of the assembly 11, the annular parts 13 and 18 are stably spaced from each other by a first annular protrusion 21 formed in an upward region on the first part and by a second annular tab 22 formed below the second part 18.

In order to ensure the stability of the connection between the two vessels 2 and 7, the outer vessel 7 has, at the base of the upper tapering region 9, an annular recess 23 that forms an abutment for the first annular part 13.

Furthermore, the inner vessel 2 is optionally provided, at its upper opening 5, with a first annular edge 24, which is folded outward, and the outer vessel 7 has, at the second opening 10, a second annular edge 25, which is folded inward and substantially faces the first edge 24, so as to prevent the upward extraction of the connecting assembly 11.

Finally, in order to further improve the stability of the assembly 11, the inner walls of the upper tapering portions 4 and 9 of the two vessels have a surface finish that is scored or in any case suitable to facilitate the anchoring of the resin in the pockets 16 and 17 and acts as pressure reduction barrier.

The suction means includes a metallic tube 26 that is welded to the convex base 8 of the outer vessel 7 and protrudes inward to connect the interspace 12 to the outside. After removing the air from the interspace, the tube 26 is sealed to form a permanent vacuum in the interspace.

In order to ensure that the formed vacuum is maintained over time, one or more tablets 27, 28 of solid chemicals that absorb gases and $H_2O$ are placed in the interspace 12.

According to the invention, the closure means 6 includes a plug 29 and an optional cup 30 that can be inserted upside down at the upper end of the bottle; the plug and the cup are both made of thermally insulating material.

An annular gasket 31 is fitted at the lower end of the plug 29 and is meant to interact with a second circumferential recess 32 which is formed at the base of the upper tapering region 4 of the inner vessel 2 and protrudes toward the inside of the inner vessel.

As an alternative, a plug having an expanding gasket may be provided.

In order to anchor the plug 29 and the cup 30, the second annular part 18 has an upper portion which protrudes from the two containers 2 and 7 and on which a first inner thread 33 and a second outer thread 35 are formed; the first thread 33 is meant to engage a threaded portion 34 formed outside the plug 29 and the second thread 35 is meant to engage a threaded portion 36 formed inside the cup 30.

It is optionally possible to provide a bottom 37 anchored to the base of the container in order to improve resting and cover the air suction tube.

The resulting thermal container ensures that the contained substances remain at the utilization temperature for a time that is similar or at least equal to, or greater than, that of conventional containers of the same type; it is furthermore light, resistant, and particularly suitable for competitive and amateur sports uses.

Both the inner vessel and the outer vessel are made of easily workable metal having a low relative density, low gas permeability, and a low degassing rate, for example aluminum and/or alloys thereof. The annular parts, the plug, and the cup can be made of thermoplastic material.

According to another subject matter of the invention, a method for producing thermal containers of the above described type is provided which includes the preparation of a first inner metallic vessel with a first upper opening and of a second outer metallic vessel with a second upper opening; the insertion of the inner vessel in the outer vessel; the insertion of a chemical gas-adsorbent means in the interspace formed between the two vessels; the mutual locking of the two vessels proximate to the respective openings by virtue of a hermetic connecting assembly that is entirely made of nonmetallic material having low thermal conductivity; the removal of the air contained in the interspace; and the hermetic closure of the interspace.

The thermal container according to the invention and the corresponding manufacturing method are susceptible of modifications and variations which are within the scope of the inventive concept defined by the accompanying claims. The details may be replaced with technical equivalents that are understood to be equally protected. The dimensions, the materials, and the shapes may be any according to the requirements.

I claim:

1. Double-walled thermal container particularly for beverages and food liquids, comprising a first inner vessel (2) made of metallic material with an upper tapering portion (4) which forms a first opening (5) which can be closed by a detachable closure means (6), a second outer vessel (7), which is made of metallic material and has an upper tapering portion (9) which forms a second opening (10), said vessels being mutually and stably joined by a connecting assembly (11) which is arranged proximate to said openings (5, 10) so as to form an interspace (12) in which vacuum is produced, said connecting assembly (11) being constituted exclusively by parts (13, 18) made of nonmetallic material with low thermal conductivity so as to form a hermetic heat barrier between said inner and outer vessels (2, 7), characterized in that said parts (13, 18) of said connecting assembly (11) comprise a first annular part (13) having circumferential end edges (14, 15) which are in contact with the inner walls of the upper tapering portions (4, 9) of said vessels (2, 7), so as to form, with said walls, at least two circumferential pockets (16, 17) in which a sealing plastic resin is injected.

2. Thermal container according to claim 1, characterized in that said inner vessel (2) has, at said first opening (5), a circumferential edge (24) that is folded outward and in that said outer vessel (7) has, at said second opening (10), a second circumferential edge (25) that is folded inward and substantially faces the first edge (18).

3. Thermal container according to claim 1, characterized in that said connecting assembly (11) comprises a second annular part (18) that has a substantially omega-shaped cross-section, is superimposed on the first part (13), and has radial edges (19, 20) which are arranged in contact with said circumferential edges (24, 25) of said inner vessel (2) and said outer vessel (7).

4. Thermal container according to claim 1, characterized in that the inner wall of the tapering portion (9) of said outer vessel (7) and the outer wall of the tapering portion (4) of said inner vessel (2) have a scored surface finish to facilitate the anchoring of the resin in the annular pockets (16, 17) and to reduce pressure losses.

5. Thermal container according to claim 1, characterized in that said outer vessel (7) has, at the lower end of the respective upper tapering portion (9), a first circumferential recess (23) that is directed inward and forms a retainer for said first annular part (13).

6. Thermal container according to claim 1, characterized in that said inner vessel (2) has, at the base of the respective upper tapering portion 4, a second circumferential recess (32) that is suitable to cooperate with said closure means (6).

7. Thermal container according to claim 1, characterized in that said second annular part (18) has a portion that protrudes upward with respect to said vessels (2, 7) and forms an anchoring means for said closure means (6).

8. Thermal container according to claim 7, characterized in that said anchoring means comprises a first inner thread (33) formed on the inner wall of said protruding portion of said second part (18) and a second thread (35) formed outside said protruding portion of said second part (18).

9. Thermal container according to claim 1, characterized in that said closure means (6) comprises a plug (29) made of thermally insulating material, which has a threaded outer portion (34) adapted to engage on said inner thread (33) of said second part (18) and an annular sealing gasket (31) adapted to interact with said second circumferential cambered portion (32).

10. Thermal container according to claim 1, characterized in that said closure means (6) comprises a cup-shaped lid (30) made of thermally insulating material that has a threaded inner portion meant to engage on said outer thread (35) of said second part (18).

11. Thermal container according to claim 1, characterized in that both said inner vessel (2) and said outer vessel (7) are made of metallic material having relatively low relative density, gas permeability, and degassing rate values.

* * * * *